(12) United States Patent
Wang et al.

(10) Patent No.: US 12,546,532 B2
(45) Date of Patent: Feb. 10, 2026

(54) COMPOSITE SURFACE LIGHT SOURCE OF REFRIGERATOR AIR DUCT AND MANUFACTURING METHOD THEREOF

(71) Applicant: QINGDAO ZHUOYINGSHE TECHNOLOGY CO., LTD., Qingdao (CN)

(72) Inventors: Enhui Wang, Qingdao (CN); Tao Wang, Qingdao (CN); Xinzhong Xie, Qingdao (CN); Xia Wang, Qingdao (CN)

(73) Assignee: QINGDAO ZHUOYINGSHE TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 19/309,629

(22) Filed: Aug. 26, 2025

(65) Prior Publication Data
US 2025/0389477 A1    Dec. 25, 2025

Related U.S. Application Data

(63) Continuation-in-part of application No. PCT/CN2024/087696, filed on Apr. 15, 2024.

(30) Foreign Application Priority Data

Apr. 21, 2023 (CN) .......................... 202310435176.9
Apr. 21, 2023 (CN) .......................... 202320915213.1

(51) Int. Cl.
*F25D 27/00* (2006.01)
*F21V 8/00* (2006.01)
*F25D 23/06* (2006.01)

(52) U.S. Cl.
CPC ........... *F25D 27/00* (2013.01); *G02B 6/0088* (2013.01); *F25D 23/061* (2013.01); *F25D 2327/00* (2013.01)

(58) Field of Classification Search
CPC .... F25D 27/00; F25D 23/061; F25D 2327/00; G02B 6/0088
See application file for complete search history.

(56) References Cited

U.S. PATENT DOCUMENTS

2018/0160824 A1* 6/2018 Lee .................. F25D 23/028
2018/0164030 A1* 6/2018 Lee .................. G02B 6/0095
2019/0316837 A1* 10/2019 Weber ................ G02B 6/0083

FOREIGN PATENT DOCUMENTS

CN      104049805 A    9/2014
CN      105910369 A    8/2016
(Continued)

OTHER PUBLICATIONS

International Search Report of PCT/CN2024/087696.
Search Report of CN202310435176.9.

*Primary Examiner* — Alexander K Garlen
(74) *Attorney, Agent, or Firm* — J.C. PATENTS

(57) ABSTRACT

The application provides a composite surface light source of a refrigerator air duct, comprising: a diffusion layer; a light guide layer; a wire harness, connected with a LED light bar; and an air duct injection mold, arranged as a sunken frame structure, and a glue-dispensing groove and a wire-threading slot are provided at an edge thereof; wherein, the wire harness, the LED light bar and the light guide layer are disposed in the air duct injection mold, and the LED light bar directly faces the light guide layer; a glue layer is arranged in the glue-dispensing groove, and the diffusion layer is pressed to connect with the air duct injection mold through the glue layer; and an end of the wire harness penetrates the wire-threading slot, and a sealant is arranged in the wire-threading slot.

14 Claims, 7 Drawing Sheets

(56) References Cited

FOREIGN PATENT DOCUMENTS

| | | |
|---|---|---|
| CN | 106545814 A | 3/2017 |
| CN | 208204897 U | 12/2018 |
| CN | 209294920 U | 8/2019 |
| CN | 110425459 A | 11/2019 |
| CN | 110953816 A | 4/2020 |
| CN | 215337286 U | 12/2021 |
| CN | 114383375 A | 4/2022 |
| CN | 114485026 A | 5/2022 |
| CN | 116294406 A | 6/2023 |
| CN | 219756761 U | 9/2023 |
| KR | 20130112524 A | 10/2013 |

\* cited by examiner

COMPOSITE SURFACE LIGHT SOURCE OF REFRIGERATOR AIR DUCT AND MANUFACTURING METHOD THEREOF

The present application is a continuation-in-part application of the international application PCT/CN2024/087696 filed on Apr. 15, 2024, which claims the priority benefit of Chinese application No. 202310435176.9, filed on Apr. 21, 2023, entitled "Composite Surface Light Source of Refrigerator Air Duct and Manufacturing Method thereof", and Chinese application No. 202320915213.1, filed on Apr. 21, 2023, entitled "Composite Surface Light Source of Refrigerator Air Duct", the entireties of the above identified applications are hereby incorporated by reference.

TECHNICAL FIELD

The invention belongs to the technical field of refrigerators and freezers, and particularly relates to a composite surface light source of a refrigerator air duct and manufacturing method thereof.

BACKGROUND ART

At present, the surface light sources used by almost all refrigerators and freezers in the market are assembled by manual operation; and the specific steps are generally: adhering a light guide layer, a diffusion layer, a reflective layer, etc. of an optical module with double-sided tapes layer by layer, sealing the edge with transparent tapes, and then mounting an aluminum alloy or plastic frame; the assembly method has the following defects: (1) the assembly process is relatively complex, and it is difficult to realize automatic production; (2) as labor cost continues to rise, the enterprises have difficulty recruiting workers and are unable to ensure that customer orders are completed in time; and (3) there are many bonding processes, the glue amount is large, the glue viscosity is reduced after encountering water, meanwhile, the manual operation is unstable, and the waterproof requirement cannot be met.

In addition, the conventional surface light sources in the prior art are mostly finished assembly products formed by assembling in a surface light source factory, and then the finished assembly products are sent to an air duct assembly factory, and then are mounted on air duct assemblies by screws, buckles, or the like. The following defects exist: more materials are used, and the assembly process is repeated, resulting in a high cost.

SUMMARY OF THE INVENTION

To address some of the above defects existing in surface light sources used in refrigerators and freezers in the prior art, the present application provides a composite surface light source of a refrigerator air duct and a manufacturing method thereof.

In a first aspect of the present application, a composite surface light source of a refrigerator air duct is provided, comprising:
  a diffusion layer;
  a light guide layer;
  a wire harness, connected with a LED light bar; and
  an air duct injection mold, arranged as a sunken frame structure, and a glue-dispensing groove and a wire-threading slot are provided at an edge of the sunken frame structure;

wherein, the wire harness, the LED light bar and the light guide layer are disposed in the air duct injection mold, and the LED light bar directly faces the light guide layer; a glue layer is arranged in the glue-dispensing groove, and the diffusion layer is pressed to connect with the air duct injection mold through the glue layer; and an end of the wire harness penetrates the wire-threading slot, and a sealant is arranged in the wire-threading slot.

The diffusion layer, the light guide layer, and the wire harness connected with the LED light bar of the composite surface light source of the refrigerator air duct form a surface light source, and the air duct injection mold forms an air duct backplane, the present application integrates the existing surface light source and the air duct backplane into a whole, which can save material cost and labor cost, and facilitates subsequent automatic assembly; and the waterproof problem of the surface light source can be thoroughly solved from the structure, and the waterproof level of the composite surface light source can be greatly improved.

In some embodiments, the composite surface light source of the refrigerator air duct further comprises a reflective layer, and the reflective layer is disposed between the light guide layer and the air duct injection mold. The reflective layer faces the light guide layer and reflects the received light to the light guide layer.

In some embodiments, a frame is formed on a periphery of a surface of the diffusion layer by screen printing; and the diffusion layer seals the light guide layer, the reflective layer and the LED light bar in the sunken frame structure of the air duct injection mold.

In some embodiments, the diffusion layer, the light guide layer, the reflective layer and the LED light bar are all set as rectangle, and the air duct injection mold is arranged as a rectangular sunken frame. A size of the reflective layer and a size of the light guide layer are substantially equal, and the reflective layer and the light guide layer are sequentially mounted in the rectangular sunken frame; and the diffusion layer is located outermost and is adjacent to the light guide layer.

In some embodiments, a gap is formed between the light guide layer and the diffusion layer.

In some embodiments, the wire harness, the LED light bar and the light guide layer are fixed in the air duct injection mold.

In some embodiments, the glue-dispensing groove is substantially an annular groove surrounding the sunken frame structure, and is disconnected at the wire-threading slot, providing a space for the arrangement of the wire harness.

In some embodiments, two sides of the glue-dispensing groove are respectively provided with an anti-overflow raised block. A glue-holding space is formed between the glue-dispensing groove and the anti-overflow raised blocks.

In some embodiments, the glue-dispensing groove is a semi-cylindrical groove.

In a second aspect of the present application, a manufacturing method of a composite surface light source of a refrigerator air duct is provided, which may be used to manufacture the composite surface light source of the refrigerator air duct according to any one of the embodiments described above, and the manufacturing method comprising the following steps:
  performing screen printing on the diffusion layer: forming the frame on the periphery of the surface of the diffusion layer by screen printing;

connecting the wire harness with the LED light bar: the LED light bar is connected to the wire harness;

setting the glue-dispensing groove and the wire-threading slot on the air duct injection mold: the air duct injection mold is arranged as the sunken frame structure, and the glue-dispensing groove and the wire-threading slot are formed at the edge of the air duct injection mold;

arranging the wire harness, the LED light bar and the light guide layer in the air duct injection mold: the wire harness, the LED light bar and the light guide layer are sequentially arranged in the air duct injection mold, and the LED light bar faces the light guide layer directly;

adhering and pressing the diffusion layer and the air duct injection mold: the glue layer is placed in the glue-dispensing groove, and the diffusion layer and the air duct injection mold are pressed to connect through the glue layer;

sealing the wire-threading slot: the end of the wire harness penetrates the wire-threading slot, and the sealant is disposed in the wire-threading slot.

In some embodiments, the manufacturing method further comprises: a reflective layer is disposed between the air duct injection mold and the light guide layer; and the reflective layer faces the light guide layer to reflect received light into the light guide layer.

In some embodiments, the manufacturing method further comprises: the glue layer is placed in the glue-dispensing groove, wherein a height of the glue layer is higher than a height of the anti-overflow raised block; the diffusion layer and the air duct injection mold are pressed to connect through the glue layer, and the glue layer is squeezed and distributed into the glue-holding space.

The composite surface light source of the refrigerator air duct and the manufacturing method thereof provided in the present application have the following beneficial effects:

The diffusion layer, the light guide layer and the wire harness connected with the LED light bar of the composite surface light source provided by at least one embodiment of the present application constitute a surface light source assembly, and the air duct injection mold thereof is equivalent to an air duct backplane in the prior art, the present application integrates the existing surface light source and the air duct backplane into a whole, thereby reducing material use, reducing manual assembly work, saving material cost and labor cost, greatly reducing costs, and facilitating subsequent automatic assembly.

The composite surface light source provided by at least one embodiment of the present application avoids the use of double-sided tapes and transparent tapes bonding methods in traditional surface light sources, and completely solves the problem of substandard waterproofing caused by poor manual gluing or insufficient tape viscosity; it completely solves the problem of surface light source waterproofing from structure, and can greatly improve the surface light source's waterproofing level.

The composite surface light source provided by at least one embodiment of the present application omits an aluminum alloy frame and other parts used for clamping and fixing an optical module in the prior art, which is beneficial to reducing and simplifying processes, saving labor costs, facilitating automatic assembly by using manipulators, and greatly improving production efficiency.

In the composite surface light source provided by at least one embodiment of the present application, the diffusion layer thereof is provided as a diffusion plate, which is an appearance part and has a function of diffusion layer and appearance layer; the diffusion layer can be arranged directly externally, and the periphery is screen printing structure to replace the structure of the aluminum alloy frame on the periphery of the diffusion plate in the prior art, so that the material cost and the manual assembly cost can be reduced.

In the composite surface light source provided in at least one embodiment of this application, a gap is provided between the light guide layer and the diffusion layer to avoid a phenomenon of poor luminescence; and the light guide layer can be fixed on the air duct injection mold, to ensure that the gap is disposed between the light guide layer and the diffusion layer.

In the composite surface light source provided by at least one embodiment of the present application, the LED light bar can be fixed on the air duct injection mold, which is beneficial to ensure that the LED light bar is aligned with the light guide layer to ensure a light emitting effect.

In the composite surface light source provided by at least one embodiment of the present application, the anti-overflow raised block is arranged at both sides of the glue-dispensing groove respectively, which facilitates the formation of the glue-holding space between the air duct injection mold and the diffusion layer, which is conducive to accommodating the glue layer, and avoids glue overflow when the diffusion layer is pressed and connected with the air duct injection mold; the gap distance can be formed between the anti-overflow raised block and the glue-dispensing groove, which is more conducive to accommodating the glue layer and effectively preventing glue overflow.

wherein, 1 diffusion layer; 101 frame; 2 light guide layer; 3 wire harness; 4 LED light bar; 5 air duct injection mold; 501 glue-dispensing groove; 502 wire-threading slot; 503 anti-overflow raised block; 504 glue-holding space; 505 sunken frame structure, 506 glue layer, 507 sealant, 6 reflective layer; 7 gap.

DETAILED DESCRIPTION OF THE EMBODIMENTS

The technical solutions of the present application will be described in detail below in combination with specific embodiments. However, it should be understood that elements, structures and features in one embodiment may also be advantageously incorporated into other embodiments without further description.

In the description of the present application, it should be noted that terms such as "first" and "second" are used for descriptive purposes only, and cannot be understood as indicating or implying the relative importance, or implicitly indicating the number of indicated technical features. Therefore, the features defined with "first" and "second" may explicitly or implicitly include one or more of these features.

Figure 1:
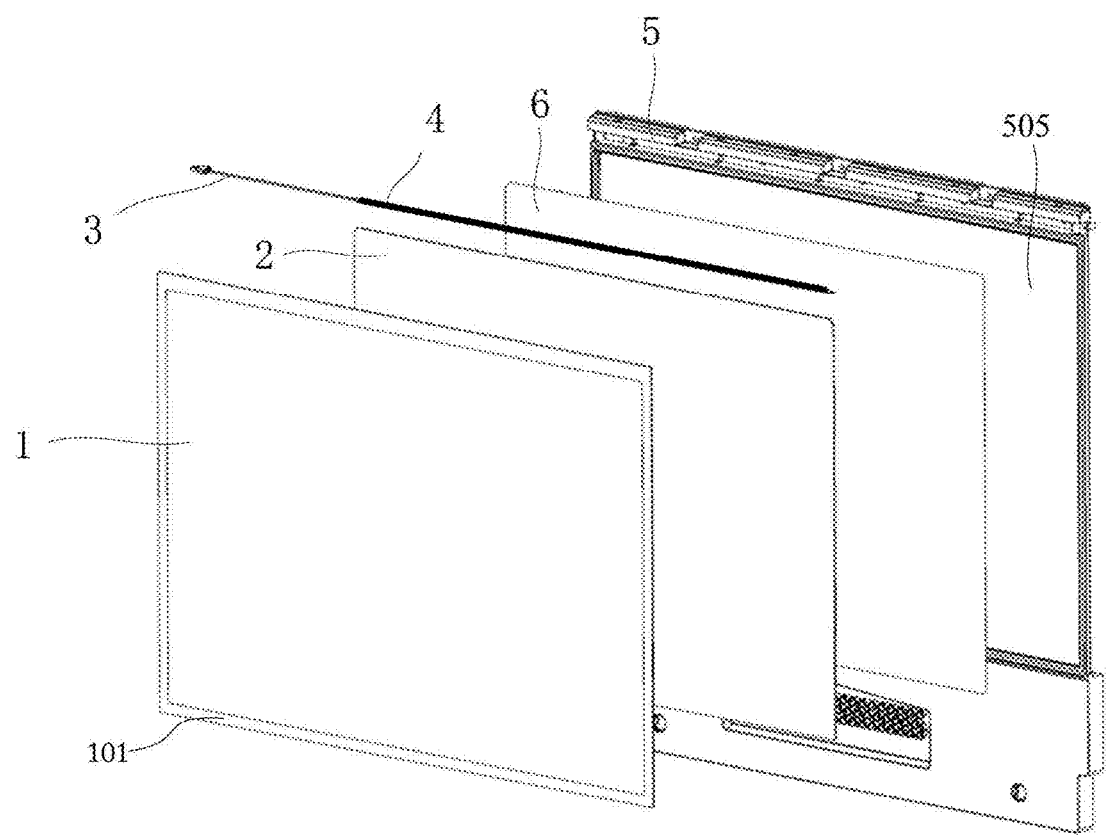
FIG. 1 is a schematic exploded structural diagram of a composite surface light source of a refrigerator air duct according to an embodiment of the present application.
Figure 2:
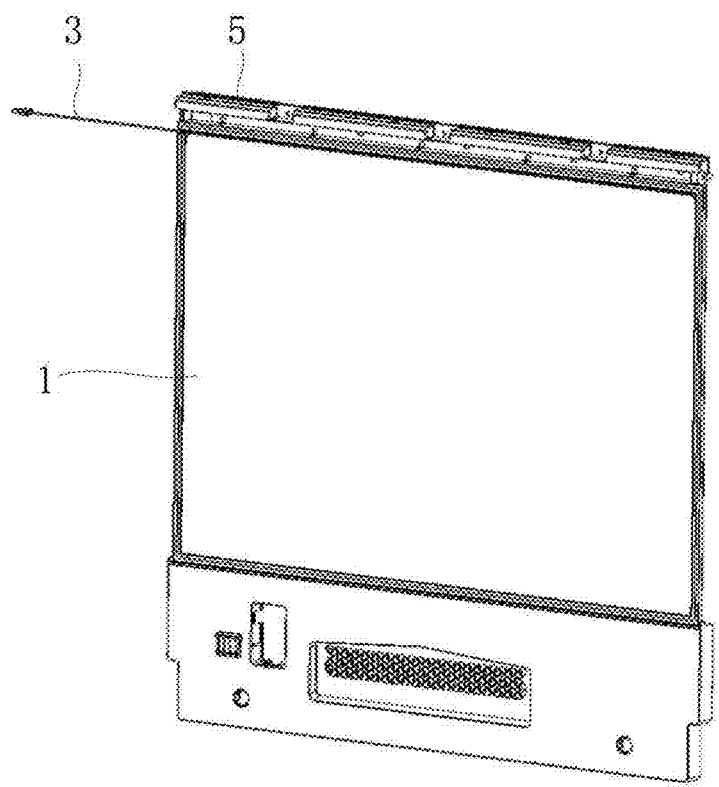
FIG. 2 is a schematic combined structural diagram of the composite surface light source of the refrigerator air duct according to an embodiment.
Figure 3:
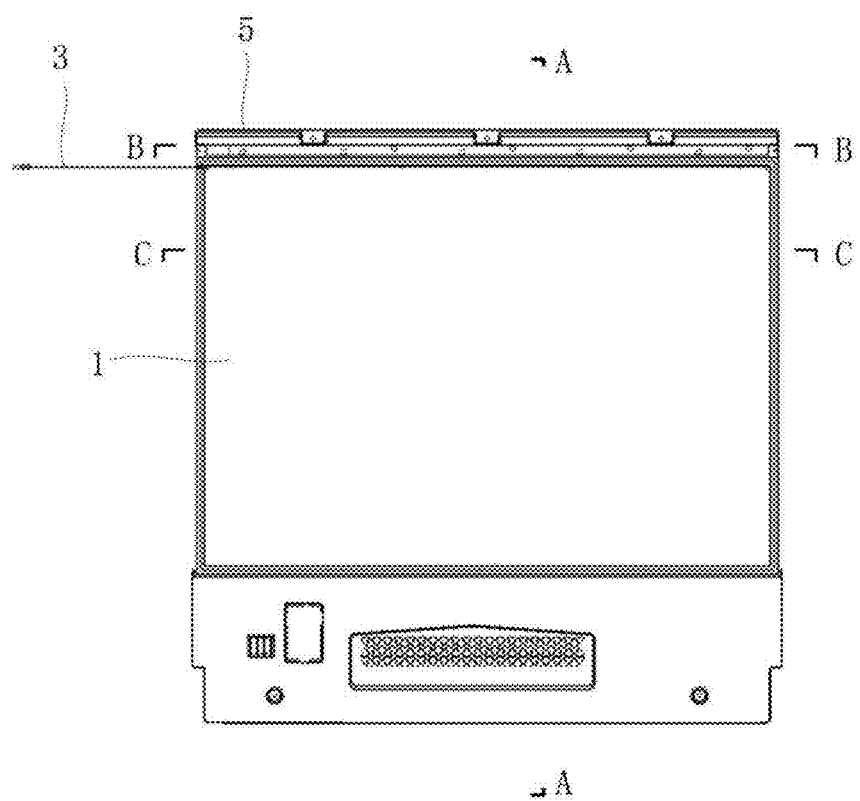
FIG. 3 is a front view of the composite surface light source of the refrigerator air duct according to an embodiment.
Figure 4:
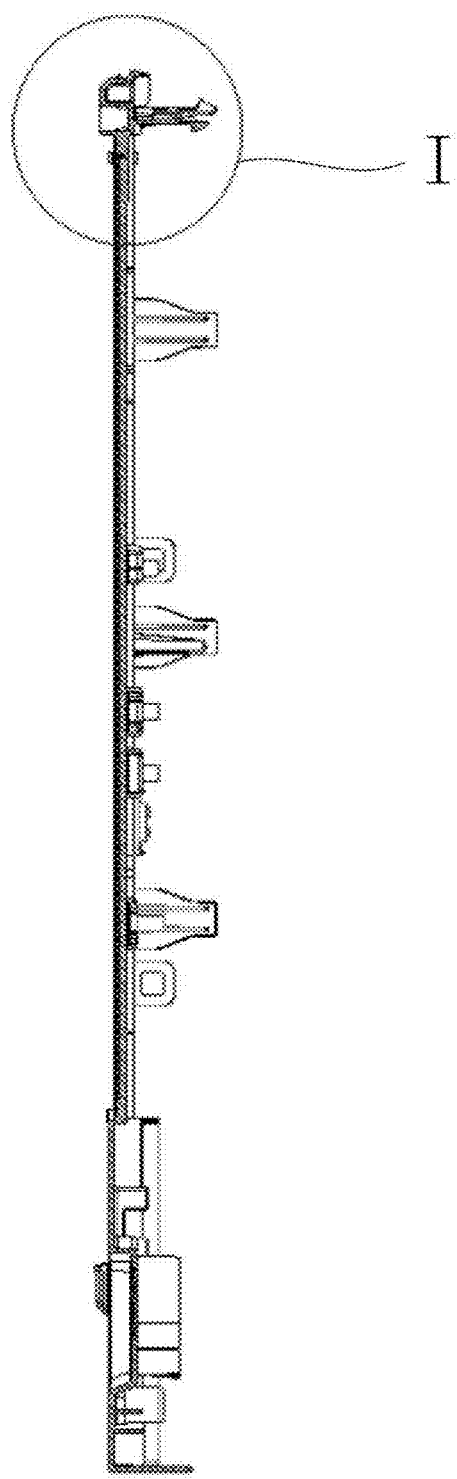
FIG. 4 is a cross-sectional view taken along line A-A in FIG. 3.

In the description of the present application, it should be noted that the terms "up", "down", "bottom", "inside" and the like indicate the positional or positional relationship according to the positional relationship shown in FIG. 1, merely for the convenience of describing the present application and the simplified description, but do not indicate or imply a devices or an element referred to must be of a particular orientation, constructed and operated in a particular orientation and therefore should not be construed as limiting the present application.

In the description of the present application, it should be noted that the terms "connect", "connecting" and "connected" should be understood in a broad sense unless otherwise clearly specified and limited. For example, they might be fixed connection, detachable connection, or integrated connection; might be direct connection or indirect connection through an intermediate medium, and might be internal connection of two elements. For those of ordinary skill in the art, the specific meanings of the above-mentioned terms in the present application can be understood under specific circumstances.

Figure 5:
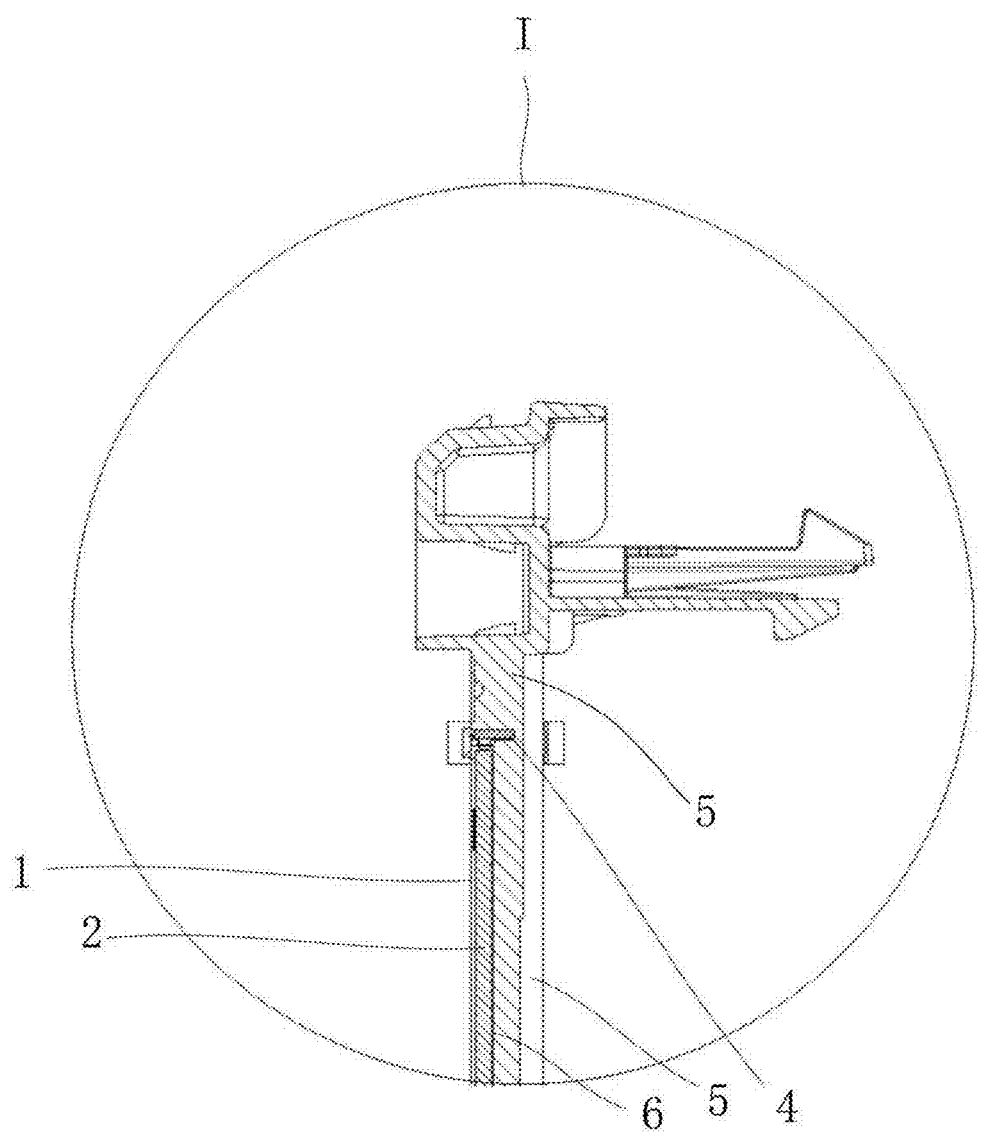
FIG. 5 is an enlarged view of part I in FIG. 4.
Figure 6:
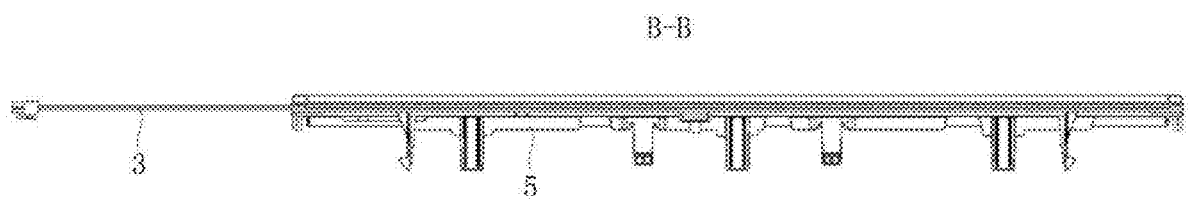
FIG. 6 is a cross-sectional view taken along line B-B in FIG. 3.
Figure 7:
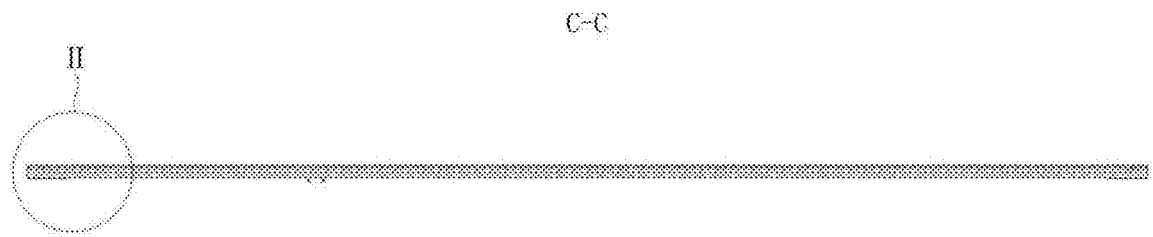
FIG. 7 is a cross-sectional view taken along line C-C in FIG. 3.
Figure 9:
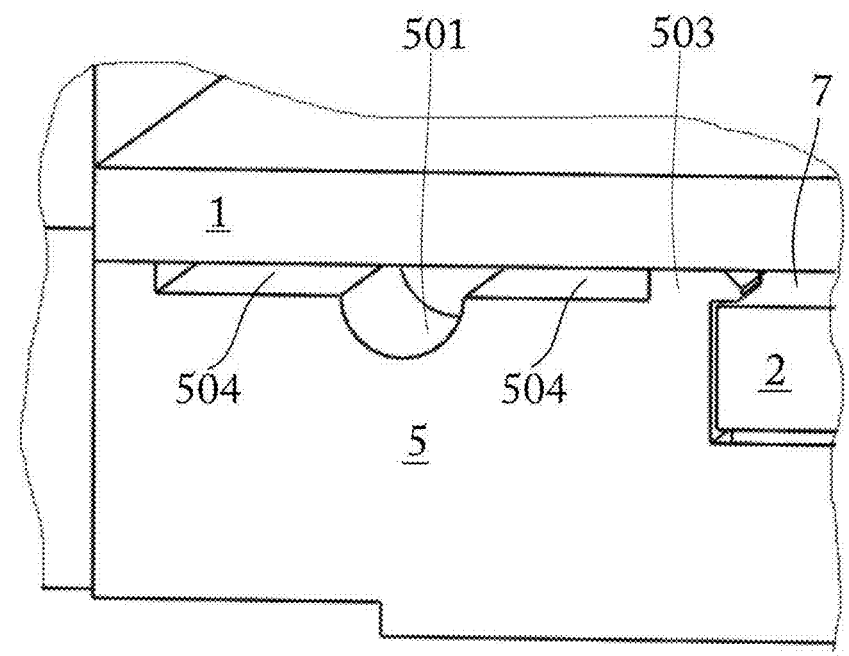
FIG. 9 is a schematic structural diagram at a glue-dispensing groove according to an embodiment.
Figure 10:
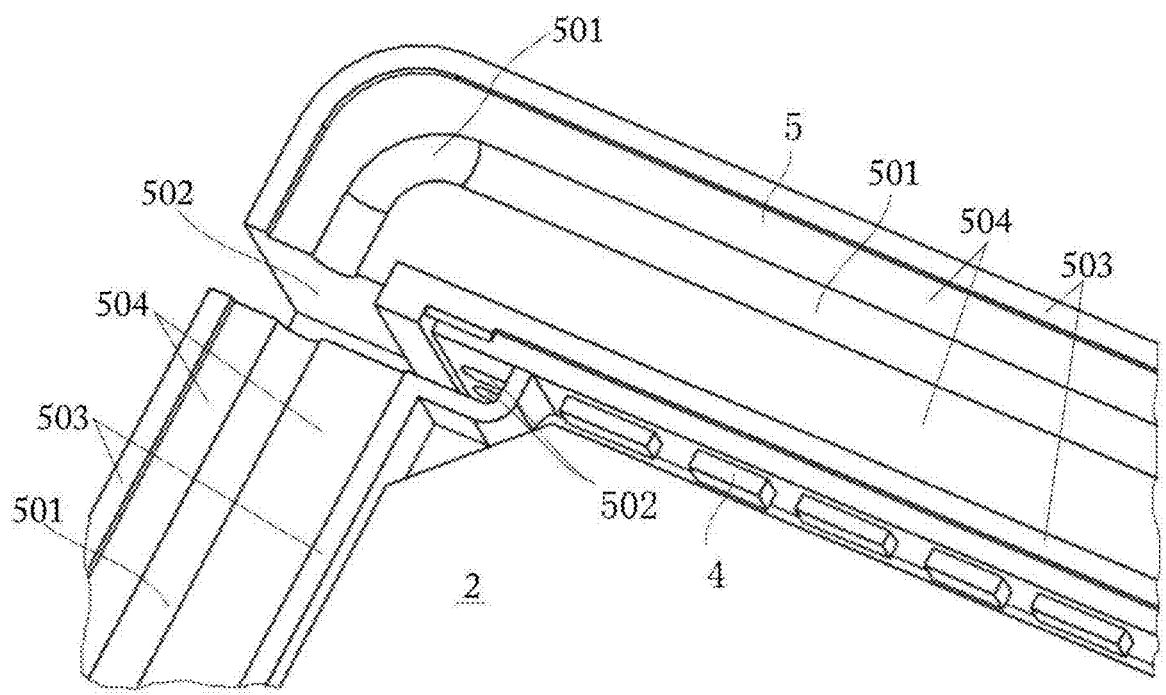
FIG. 10 is a schematic structural diagram at a wire-threading slot according to an embodiment.
Figure 11:
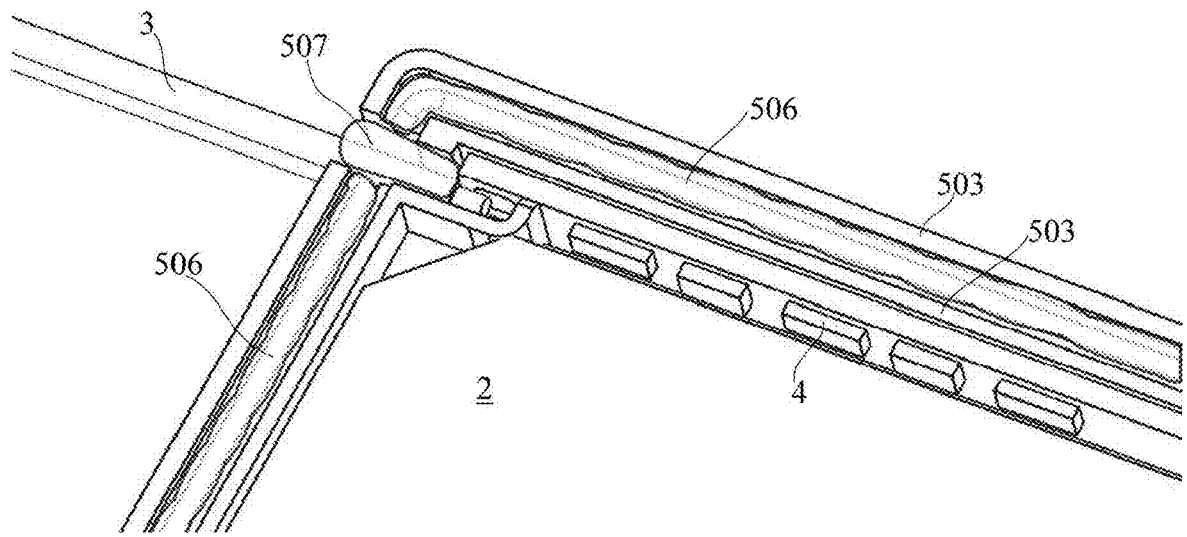
FIG. 11 is a schematic diagram of an air duct injection mold with a glue layer and a sealant.

Referring to FIGS. 1-11, a first embodiment of the present application provides a composite surface light source of a refrigerator air duct (hereinafter referred as the composite surface light source for short), including a diffusion layer 1, a light guide layer 2, a wire harness 3 and an air duct injection mold 5. A frame 101 is formed at a surface of the diffusion layer 1 by screen printing; the wire harness 3 is connected with an LED light bar 4. The air duct injection mold 5 is arranged as a sunken frame structure 505, a glue-dispensing groove 501 and a wire-threading slot 502 are provided at an edge of the sunken frame structure 505. The wire harness 3, the LED light bar 4 and the light guide layer 2 are arranged in the air duct injection mold 5, and the LED light bar 4 directly faces the light guide layer 2, as shown in FIG. 5. As shown in FIG. 11, A glue layer 506 is arranged in the glue-dispensing groove 501, and the diffusion layer 1 is connected with the air duct injection mold 5 through the glue layer 506 in a press fit manner; and an end of the wire harness 3 penetrates into the wire-threading slot 502, and a sealant 507 is disposed in the wire-threading slot 502.

The diffusion layer 1, the light guide layer 2 and the wire harness 3 connected with the LED light bar 4, of the composite surface light source, constitute a surface light source assembly; and the air duct injection mold 5 thereof is equivalent to an air duct backplane in the prior art. The present application integrates the surface light source and the air duct backplane in the prior art into a whole, thereby reducing material use, reducing labor assembly, saving material cost and labor cost, greatly reducing costs, and facilitating subsequent automatic assembly; in addition, the waterproof problem of the surface light source is thoroughly solved from the structure, and the waterproof level of the composite surface light source can be greatly improved.

The diffusion layer 1 may be a diffusion plate, which is an appearance member and has a function of diffusion layer and an appearance layer. The diffusion Layer 1 is usually made of PS material (polystyrene), is a common plate-shaped structure in surface light source, is used to homogenize the light in the light guide layer 2 and shield some defects of the light guide layer 2, and is therefore also referred to as a light-homogenizing layer.

As shown in FIG. 1, a periphery of the surface of the diffusion layer 1 may form the frame 101 by screen printing. The screen printing may use ink as a coating material, and generally two layers are printed, which are black ink printing and silver ink printing in sequence, so that the frame 101 is formed at the periphery of the surface of the diffusion layer 1, which can play a role of shading and prevent light leakage in the sunken frame structure 505. The diffusion layer 1 is arranged directly externally, and the peripheral screen printing structure is used to replace the structure of the aluminum alloy frame on the periphery of a diffusion plate in the prior art, so that the material cost and the manual assembly cost can be reduced.

The light guide layer 2 is used for emitting light, usually made of PMMA material (polymethyl methacrylate), and is also a common plate-shaped structure in surface light source. The LED light bar 4 may be welded on the wire harness 3. The wire harness 3, the LED light bar 4 and the light guide layer 2 are placed in the sunken frame structure 505 of the air duct injection mold 5. The glue-dispensing groove 501 is provided at the edge of the air duct injection mold 5; and there may be a plurality of glue-dispensing grooves 501, which are uniformly distributed around the periphery of the air duct injection mold 5. A glue dispenser may be used to perform a circle of glue in the plurality of glue-dispensing grooves 501 at the periphery of the air duct injection mold 5, and then the diffusion layer 1 is placed on the air duct injection mold 5 and pressed, so that the diffusion layer 1 is attached to the edge of the air duct injection mold 5 and connected; and finally, the wire-threading slot 502 is sealed by using the sealant 507.

Figure 8:
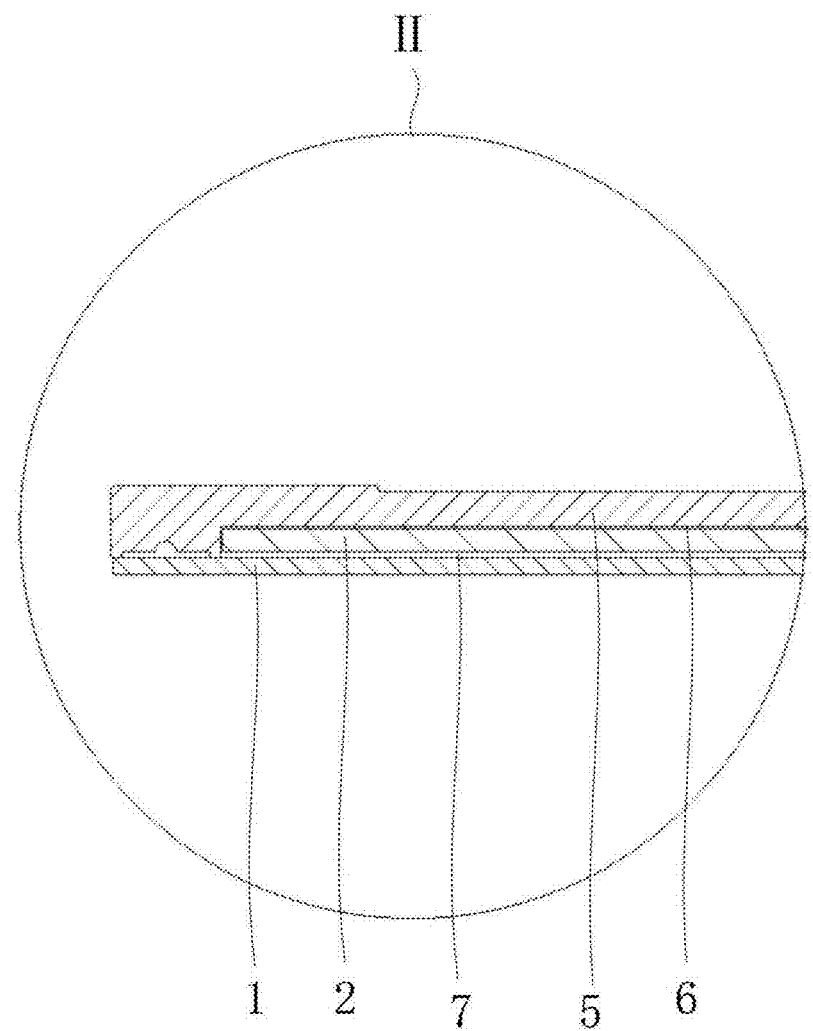
FIG. 8 is an enlarged view of part II in FIG. 7.

As shown in FIG. 1, FIG. 5 and FIG. 8, in some embodiments, the composite surface light source further includes a reflective layer 6, disposed between the light guide layer 2 and the air duct injection mold 5, that is, the reflective layer 6 is disposed at a back surface of the light guide layer 2, and the reflective layer 6 and the light guide layer 2 can be sequentially placed into the sunken frame structure 505 of the air duct injection mold 5. According to actual use conditions, for example, when the air duct injection mold 5 is coated with reflective material, an independent reflective layer 6 can be omitted. The reflective layer 6 faces the light guide layer 2, and can be used to reflect light from the light guide layer 2 and the LED light bar 4, so that the light is returned to the light guide layer 2 to increase brightness; the reflective layer 6 is usually made of a PET material (polyethylene terephthalate), which is a common sheet structure in surface light source.

The diffusion layer 1, the light guide layer 2, the reflective layer 5 and the LED light bar 4 are all arranged as rectangle, and the air duct injection mold 5 is set as a rectangular sunken frame. The size of the light guide layer 2 and the size of the reflective layer 5 is each substantially the same as the size of the interior of the rectangular sunken frame to accommodate the light guide layer 2 and the reflective layer 5 in the rectangular sunken frame. The edge of the diffusion layer 1 is substantially aligned with the edge of the air duct injection mold 5 to form a seal for the rectangular sunken frame through the glue layer 506.

As shown in FIG. 8, in some embodiments, a gap 7 is formed between the light guide layer 2 and the diffusion layer 1 to avoid a phenomenon of poor light emission. The wire harness 3, the LED light bar 4 and the light guide layer 2 may be fixed in the air duct injection mold 5, that is, fixing structures such as slots may be provided on the air duct injection mold 5 to fix them.

The light guide layer 2 is fixedly connected to the air duct injection mold 5 through the fixing structure, which facilitates the fixation of the light guide layer 2, and facilitates the formation of the gap 7 between the light guide layer 2 and the diffusion layer 1, which is beneficial to avoid the phenomenon of poor light emission.

The thickness of the light guide layer 2 may be 1.8-2.5 mm, such as 1.9 mm, 2.0 mm, 2.1 mm, 2.2 mm, 2.3 mm, 2.4 mm, etc.; enough space is provided for mutual reflection of light from the LED light bar to reflect between the front and rear surfaces of the light guide layer 2.

The LED light bar 4 is fixedly connected to the air duct injection mold 5 through the fixing structure, which is beneficial to ensure that the LED light bar 4 is kept in the correct position in the air duct injection mold 5, so that the LED light bar 4 is aligned with the light guide layer 2, and the normal light-emitting effect is ensured. The LED light bar 4 may be aligned with a sidewall of an edge of the light guide layer 2. As shown in FIG. 5, the LED light bar 4 is aligned with a sidewall of an upper edge of the light guide layer 2, so that light from the LED light bar 4 can propagate in the light guide layer 2 and diffuse to be the surface light source.

In some embodiments, as shown in FIGS. 9-11, wherein FIG. 9 is a partial cross-sectional view of the composite surface light source, FIG. 10 is a partial schematic diagram of the composite surface light source when the diffusion layer 1 has not been arranged, and FIG. 11 is a schematic diagram of the air duct injection mold 5 with the glue layer 506 and the sealant 507; the edge of the air duct injection mold 5 is provided with the glue-dispensing groove 501 which is a substantially annular groove formed around the sunken frame structure 505, wherein the glue layer 506 for bonding and sealing is able to be accommodated; in FIG. 10, the glue-dispensing groove 501 is disconnected at the wire-threading slot 502 to provide a space for the arrangement of the wire harness 3.

More specifically, as shown in FIG. 9, the glue-dispensing groove 501 is a semi-cylindrical groove, which facilitates guiding and traveling of the glue dispenser. Two sides of the glue-dispensing groove 501 are respectively provided with an anti-overflow raised block 503, which facilitates the formation of a glue-holding space 504 between the air duct injection mold 5 and the diffusion layer 1, conducive to accommodating the glue layer 506 and avoiding glue overflow when the diffusion layer 1 and the air duct injection mold 5 are pressed.

When the glue-dispensing groove 501 is the semi-cylindrical groove, sidewalls of two sides of an opening of the glue-dispensing groove 501 respectively extend to an outer side to form a plane (i.e. bottom surfaces of the glue-holding space 504). The anti-overflow raised blocks 503 are respectively arranged on the planes on both sides, and the anti-overflow raised blocks 503 at two sides can be arranged symmetrically. The anti-overflow raised block 503 may be a rectangular block-shaped protrusion. A gap distance is formed between the anti-overflow raised block 503 and the glue-dispensing groove 501, which is beneficial to accommodating the glue layer 506 and avoiding glue overflow.

When glue is dispensed in the glue-dispensing groove 501, a height of the glue layer 506 is higher than a height of the anti-overflow raised block 503; so that when the diffusion layer 1 is adhered to the air duct injection mold 5, the diffusion layer 1 can be attached to the surface of the anti-overflow raised block 503, and can squeeze the glue layer 506 from the glue-dispensing groove 501 to the glue-holding space 504, so that on the one hand the diffusion layer 1 is bonded to the air duct injection mold 5, and on the other hand, the glue layer 506 forms a circle of seal to prevent external water vapor and the like from entering the sunken frame structure 505 of the air duct injection mold 5.

As shown in FIG. 10, in some embodiments, at least two LED light bars 4 connected to the wire harness 3 are provided, which are uniformly distributed.

The LED light bar has a printed circuit board (PCB) capable of being embedded in the sunken frame structure/rectangular sunken frame of the air duct injection mold 5, and lamp beads of the LED light bar are uniformly distributed on the PCB. In order to reduce the lateral deformation generated when the LED light bar 4 is mounted and divided, and ensure that the lamp beads are aligned with the light guide layer 2, the PCB of the LED light bar 4 can be set to a wider width according to the actual situation to meet the stable fixation of the LED light bar 4, which is beneficial to face the light guide layer 2.

The wire-threading slot 502 may be configured as an elliptical groove. The wire-threading slot 502 is in communication with the interior and the outside of the composite surface light source; and after the composite surface light source is formed, the wire-threading slot 502 is sealed to form a seal to the sunken frame structure 505 together with the glue layer 506 in the glue-dispensing groove 501, thereby preventing water vapor and the like from entering.

Figure 12:
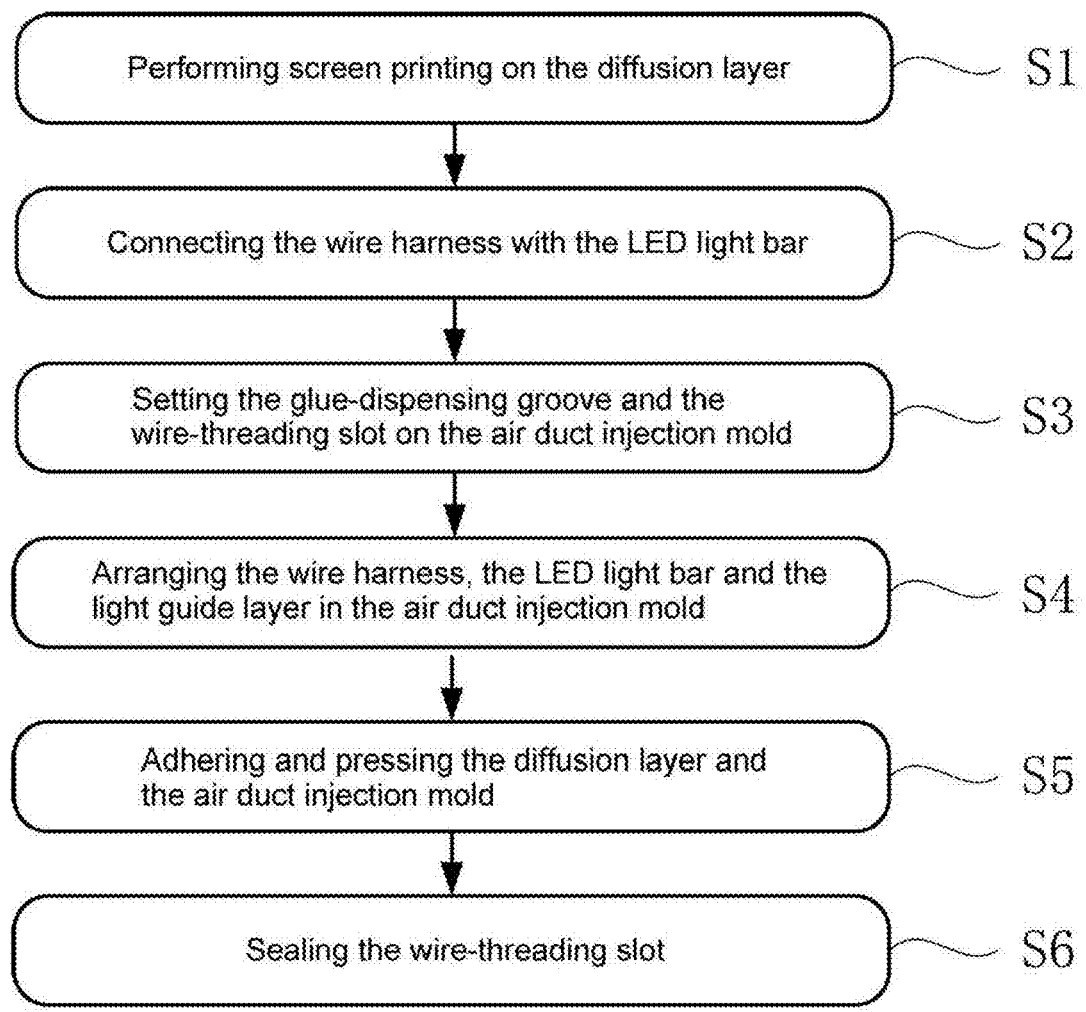
FIG. 12 is a flowchart of a manufacturing method of the composite surface light source of the refrigerator air duct according to an embodiment.

Referring to FIG. 12, a second embodiment of the present application provides a manufacturing method of a composite surface light source of a refrigerator air duct, which can be used to manufacture the composite surface light source of the refrigerator air duct described in any one of the preceding embodiments; and the manufacturing method including the following steps:

S1, performing screen printing on the diffusion layer 1: forming the frame on the periphery of the surface of the diffusion layer 1 by screen printing;

S2, connecting the wire harness 3 with the LED light bar 4: the LED light bar 4 is connected to the wire harness 3;

S3, setting the glue-dispensing groove 501 and the wire-threading slot 502 on the air duct injection mold 5: the air duct injection mold 5 is set as the sunken frame structure 505, and the glue-dispensing groove 501 and the wire-threading slot 502 are provided at the edge of the air duct injection mold 5;

S4, arranging the wire harness 3, the LED light bar 4 and the light guide layer 2 in the air duct injection mold 5: the wire harness 3, the LED light bar 4 and the light guide layer 2 are sequentially arranged in the air duct injection mold 5, and the LED light bar 4 is directly facing the light guide layer 2 from the side wall of the light guide layer 2;

S5, adhering and pressing the diffusion layer 1 and the air duct injection mold 5: the glue layer 506 is arranged in the glue-dispensing groove 501, and the diffusion layer 1 and the air duct injection mold 5 are pressed to connect through the glue layer 506;

S6, sealing the wire-threading slot 502: the end of the wire harness 3 penetrates the wire-threading slot 502, and the sealant 507 is disposed in the wire-threading slot 502.

The manufacturing method in the present embodiment can reduce and simplify procedures, save labor costs, facilitate automatic assembly by using manipulators, and greatly improve production efficiency.

The embodiments are only described as preferred embodiments of the present application, and are not intended to limit the scope of the present application. Various modifications and improvements made on the technical solutions of the present application by ordinary skill in the art without departing from the design spirit of the present application shall fall within the protective scope confirmed by the claims of the present application.

The invention claimed is:

1. A composite surface light source of a refrigerator air duct, wherein, comprising:
    a diffusion layer;
    a light guide layer;
    a wire harness, connected with a LED light bar; and
    an air duct injection mold, arranged as a sunken frame structure, and a glue-dispensing groove and a wire-threading slot are provided at an edge of the sunken frame structure;
    wherein, the wire harness, the LED light bar and the light guide layer are disposed in the air duct injection mold, and the LED light bar directly faces the light guide layer; a glue layer is arranged in the glue-dispensing groove, and the diffusion layer is pressed to connect with the air duct injection mold through the glue layer; and an end of the wire harness penetrates the wire-threading slot, and a sealant is arranged in the wire-threading slot;
    the composite surface light source further comprises a reflective layer, and the reflective layer is disposed between the light guide layer and the air duct injection mold; a frame is formed on a periphery of a surface of the diffusion layer by screen printing; and the diffusion layer seals the light guide layer, the reflective layer and the LED light bar in the sunken frame structure of the air duct injection mold.

2. The composite surface light source of the refrigerator air duct according to claim 1, wherein, the diffusion layer, the light guide layer, the reflective layer and the LED light bar are all set as rectangle, and the air duct injection mold is arranged as a rectangular sunken frame, to accommodate the light guide layer and the reflective layer.

3. The composite surface light source of the refrigerator air duct according to claim 1, wherein, the light guide layer is adjacent to the diffusion layer, and a gap is formed between the light guide layer and the diffusion layer.

4. The composite surface light source of the refrigerator air duct according to claim 1, wherein, the wire harness, the LED light bar and the light guide layer are fixed in the air duct injection mold.

5. The composite surface light source of the refrigerator air duct according to claim 1, wherein, two sides of the glue-dispensing groove are respectively provided with an anti-overflow raised block; and a glue-holding space is formed between the glue-dispensing groove and the anti-overflow raised blocks.

6. The composite surface light source of the refrigerator air duct according to claim 1, wherein, the glue-dispensing groove is a semi-cylindrical groove.

7. The composite surface light source of the refrigerator air duct according to claim 2, wherein, the light guide layer is adjacent to the diffusion layer, and a gap is formed between the light guide layer and the diffusion layer; and the wire harness, the LED light bar and the light guide layer are fixed in the air duct injection mold.

8. The composite surface light source of the refrigerator air duct according to claim 7, wherein, two sides of the glue-dispensing groove are respectively provided with an anti-overflow raised block; and a glue-holding space is formed between the glue-dispensing groove and the anti-overflow raised blocks.

9. The composite surface light source of the refrigerator air duct according to claim 8, wherein, the glue-dispensing groove is a semi-cylindrical groove.

10. The composite surface light source of the refrigerator air duct according to claim 2, wherein, two sides of the glue-dispensing groove are respectively provided with an anti-overflow raised block; and a glue-holding space is formed between the glue-dispensing groove and the anti-overflow raised blocks.

11. The composite surface light source of the refrigerator air duct according to claim 10, wherein, the glue-dispensing groove is a semi-cylindrical groove.

12. A manufacturing method of a composite surface light source of a refrigerator air duct, used to manufacture the composite surface light source of the refrigerator air duct according to claim 1; wherein, the manufacturing method comprising the following steps:
    performing screen printing on a diffusion layer: forming a frame on a periphery of a surface of the diffusion layer by screen printing;
    connecting a wire harness with a LED light bar: the LED light bar is connected to the wire harness;
    setting a glue-dispensing groove and a wire-threading slot on an air duct injection mold: the air duct injection mold is arranged as a sunken frame structure, and the glue-dispensing groove and the wire-threading slot are formed at an edge of the air duct injection mold;
    arranging the wire harness, the LED light bar and a light guide layer in the air duct injection mold: the wire harness, the LED light bar and the light guide layer are sequentially arranged in the air duct injection mold, and the LED light bar faces the light guide layer directly;
    adhering and pressing the diffusion layer and the air duct injection mold: a glue layer is placed in the glue-dispensing groove, and the diffusion layer and the air duct injection mold are pressed to connect through the glue layer; and
    sealing the wire-threading slot: an end of the wire harness penetrates the wire-threading slot, and a sealant is disposed in the wire-threading slot.

13. The manufacturing method of the composite surface light source of the refrigerator air duct according to claim 12, wherein, further comprises: a reflective layer is disposed between the air duct injection mold and the light guide layer; and the reflective layer faces the light guide layer to reflect received light into the light guide layer.

14. The manufacturing method of the composite surface light source of the refrigerator air duct according to claim 13, wherein, further comprises: the glue layer is placed in the glue-dispensing groove, wherein a height of the glue layer is higher than a height of an anti-overflow raised block; the diffusion layer and the air duct injection mold are pressed to connect through the glue layer, and the glue layer is squeezed and distributed into a glue-holding space.

* * * * *